Figure 1:
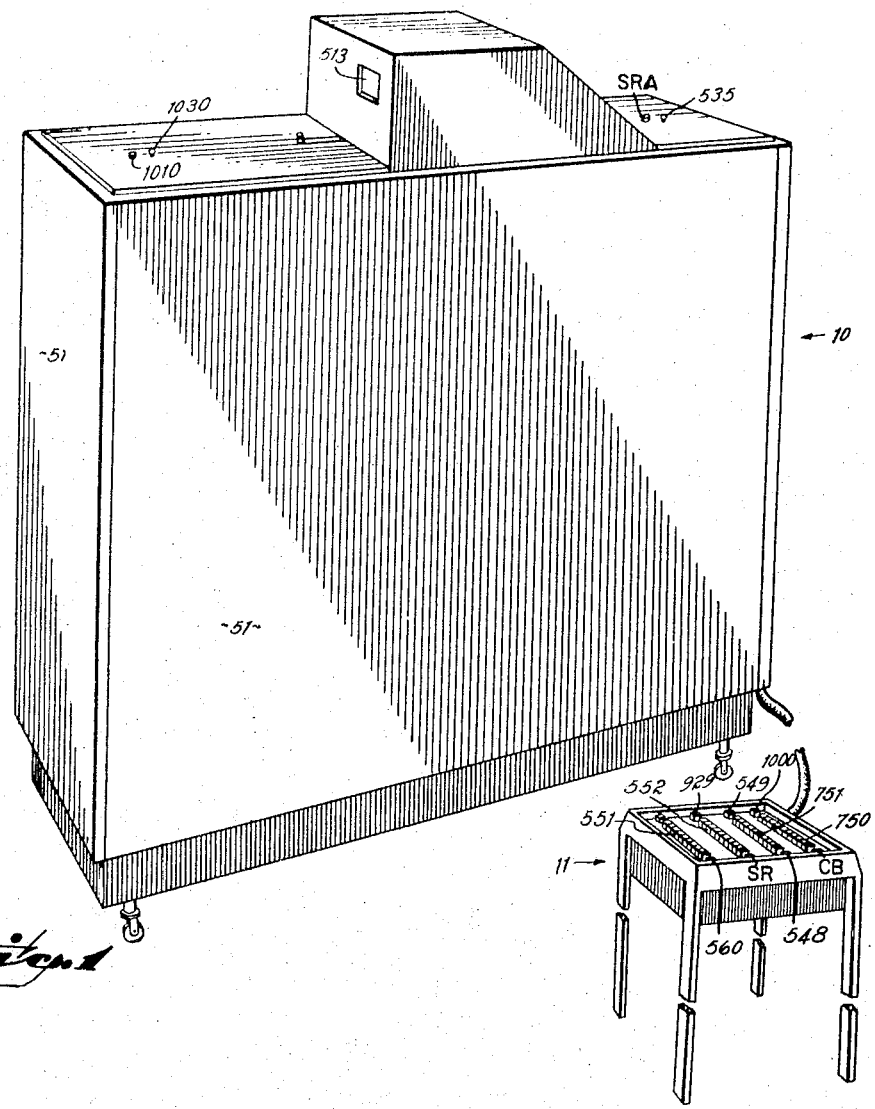

Dec. 26, 1967 R. A. LASLEY ET AL 3,360,702
DIGITAL SELECTOR SWITCH AND INDEXING MOTOR CONTROL SYSTEM
Original Filed May 9, 1963 10 Sheets-Sheet 1

INVENTORS
Robert A. Lasley
BY Siegfried K. Handel
David L. Eisenstadt

ATTORNEYS

Dec. 26, 1967  R. A. LASLEY ET AL  3,360,702
DIGITAL SELECTOR SWITCH AND INDEXING MOTOR CONTROL SYSTEM
Original Filed May 9, 1963  10 Sheets-Sheet 3

INVENTORS.
Robert A. Lasley
BY Siegfried K. Handel
David L. Eisenstadt
ATTORNEYS Dec. 26, 1967  R. A. LASLEY ET AL  3,360,702
DIGITAL SELECTOR SWITCH AND INDEXING MOTOR CONTROL SYSTEM
Original Filed May 9, 1963  10 Sheets-Sheet 6

INVENTORS
Robert A. Lasley
Siegfried K. Handel
David L. Eisenstadt
BY

ATTORNEYS

Dec. 26, 1967

R. A. LASLEY ET AL 3,360,702

DIGITAL SELECTOR SWITCH AND INDEXING MOTOR CONTROL SYSTEM

Original Filed May 9, 1963

10 Sheets-Sheet 9

INVENTORS.
Robert A. Lasley
BY Sigfried K. Handel
David L. Eisenstadt

ATTORNEYS

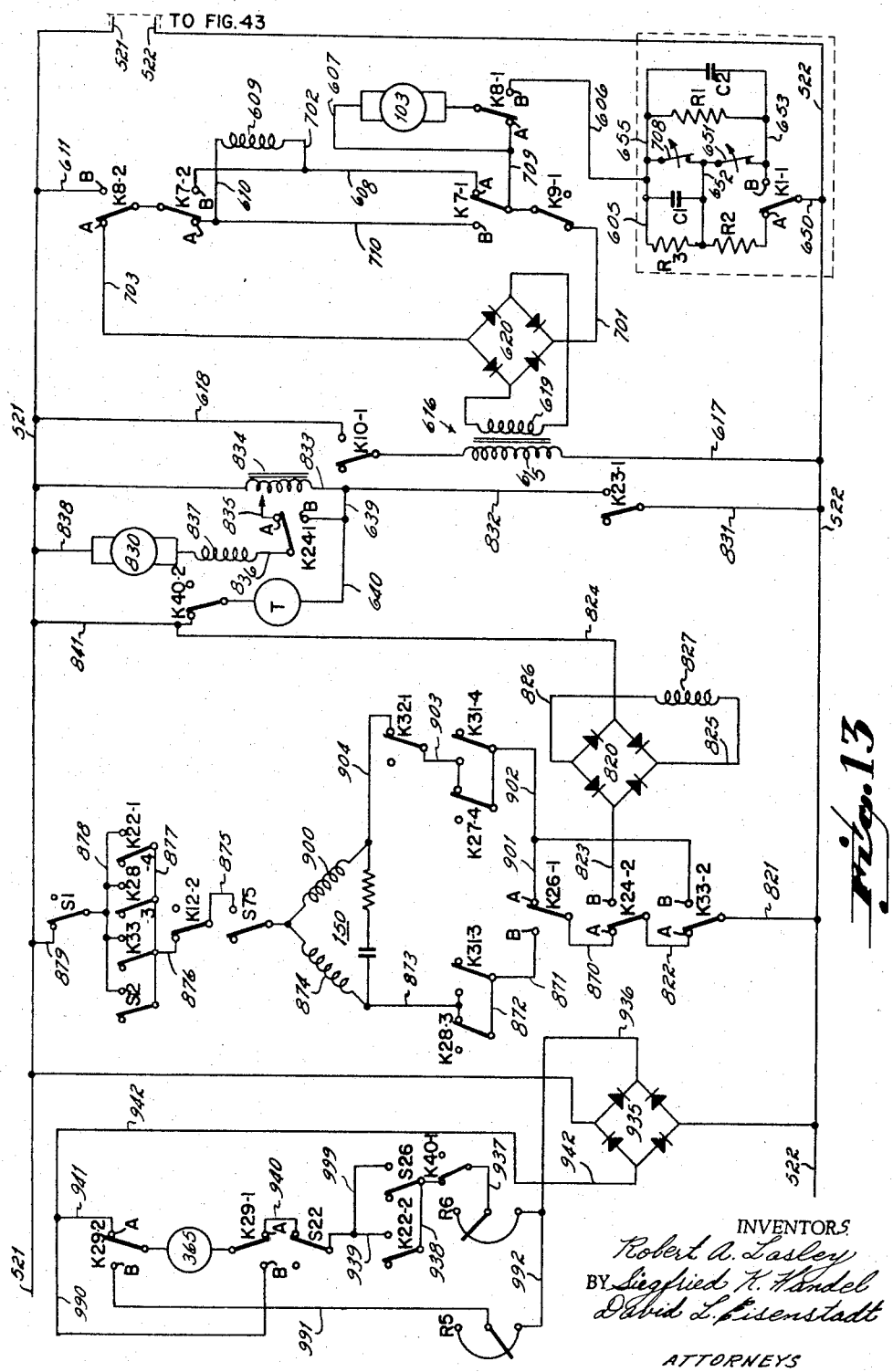

United States Patent Office 3,360,702
Patented Dec. 26, 1967

3,360,702
DIGITAL SELECTOR SWITCH AND INDEXING MOTOR CONTROL SYSTEM
Robert A. Lasley and Siegfried K. Handel, Hamilton, and David L. Eisenstadt, Cincinnati, Ohio, assignors to The Mosler Safe Company, Hamilton, Ohio, a corporation of New York
Original application May 9, 1963, Ser. No. 279,234. Divided and this application June 1, 1965, Ser. No. 460,384
5 Claims. (Cl. 318—18)

This application is a division of application Ser. No. 279,234, filed May 9, 1963. This invention relates to card selecting systems and more particularly to a card selecting system in which cards are stored in an indexable filing cabinet from and to which cards automatically and selectively are removable and returnable.

A principal objective of this invention has been to provide a new and improved index control system for use with card retrieval apparatus or with any type of rotatable or linearly indexable apparatus.

To facilitate a general understanding of the apparatus with which this index control system is disclosed and particularly adapted to be utilized, its embodiment may be visualized as apparatus for selecting one card from a group arranged in the form of a plurality of cards facially adjacent one another and in edgewise alignment whereby the cards are stored in row formation within an indexable card tray. A card selector mechanism is arranged adjacent the row, for example surmounting the top edges of the cards and the row of cards is movable relative to the selector, such that all cards of the row may be exposed progressively to selection. The cards individually are coded for cooperation with the selector, and means is provided for urging the cards toward the selector as they are scanned by it such that any card of a predetermined coding is free to move above the rest of the cards while the others are restrained against such movement. In response to a signal from an operator which designates a predetermined card, the apparatus functions within a matter of seconds to present that card to a position differentiated from the remainder of the cards whereby the operator may remove it manually or it may be removed automatically for inspection or reference.

The indexable card tray is in the form of a rotatable filing drum mounted on a horizontal axis of rotation and provided with a plurality of storage pockets or compartments located around its periphery; in this sense therefore, the card tray is the curvilinear type. With a rotatable filing drum having 50 such compartments, approximately 5000 cards of usual thickness may be stored. The selection station is located at the top of the drum, where the cards rest by gravity, while cards then at lower portions of the drum which would otherwise fall from it, are held in place by means of one or more belts embracing the lower circumferential drum portions. A tray of this type is disclosed in Knittel Patent No. 2,796,308.

Cards released by the selector for inspection or retrieval are moved relative to the nonselected cards in the tray by means of a stream of air (or gas) furnished from a nozzle arranged within the drum opposite the selector. While the air ejected from the nozzle against the bottoms of the cards urges all of them progressively toward the selector as the cards are moved relatively past it, a predetermined card, i.e. a card having a code corresponding to the code for which the selector has been set, is free to move relative to the other cards to a position in which it is selectively or removably differentiated from them. From this position, the predetermined and now "selected" card may be removed manually, or as is preferred, may be transported to a viewing or read out position.

To facilitate very rapid selection of a card, the invention provides means for indexing the drum via the shortest path and at a fast rate of speed to present the selected compartment to the selector. When the compartment is approximately adjacent the selector, the control mechanism is operable to stop the drum at the selected position. After the drum has been dynamically braked and brought to a stop, the drive system is operable to rotate the drum in the opposite direction at a slow rate of speed to move the selected compartment into alignment with the selector. Thereafter, the air stream is directed against the bottoms of the cards within the selected compartment and the unrestrained preselected card is moved upwardly into a physically discrete position.

After the selected card has been moved into a physically discrete position relative to the remainder of the cards within the pocket, the velocity stream of air is shut off and the selector fingers withdrawn from a restraining position. At this time, the selected card is engaged between card transporters which automatically detect its presence and move it to a viewing position. The control system is operative thereafter to automatically move the drum relative to the card transporter to a position preparatory to return of the card to the drum.

It has been one objective of the invention of this application to provide a control system operable to very accurately control indexing movement of a carrier to a selected position in a minimum of time and through the shortest possible path from one selected compartment to the selector station. The movement occurs first at a fast rate of speed until the carrier reaches its selected position, after which the carrier coasts to a stop while it is dynamically braked by the driving motor and then is rotated in the opposite direction at a slow rate of speed to the exact final position in which the actual selection is conducted.

Another objective of this invention has been to provide a compact control system operable to accurately control indexing of a heavy drum, card carrier or other type of indexable member by means of a control system utilizing a minimum of mechanical parts. The control system of this invention accomplishes the enumerated movements without the use of any mechanical brakes or clutches and uses as a principal control element a digital control switch. Because there are no clutches and the motor is dynamically brought to a stop rather than mechanically braked, the space requirement for the control system is minimized. Additionally, the control switch, because it operates on a digital principle, has far fewer contacts than the number of positions to which the drum is indexable. Reduction of the number of contacts materially decreases the space requirement of the switch and the complexity of the control system.

Still another objective of this invention has been to provide an improved and compact index control switch to be used in an electrical control circuit to control either rotatable or linear movement of an indexable member so as to move the member in a direction to cause it to move from any one position to any other selected position through the shortest path of movement.

Figure 2:
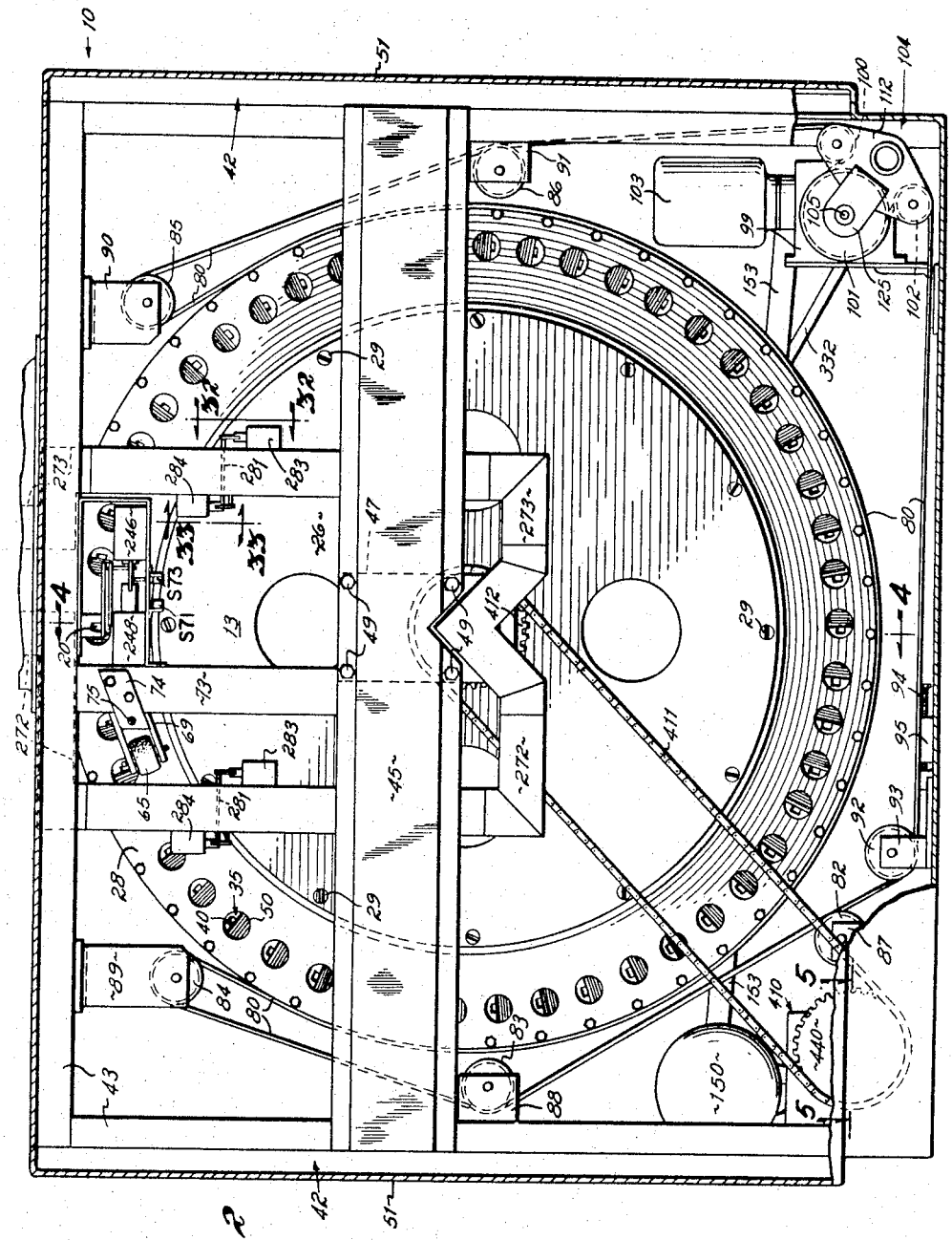
Figure 3:
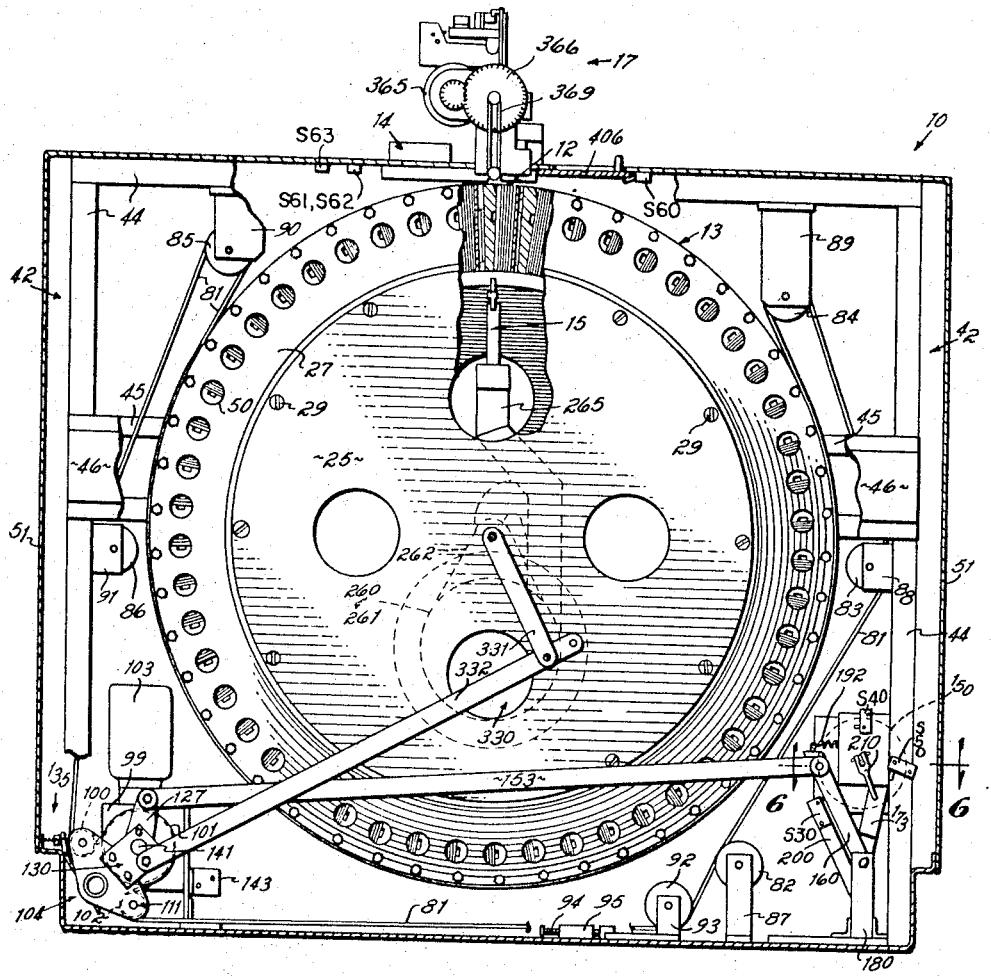
Figure 4:
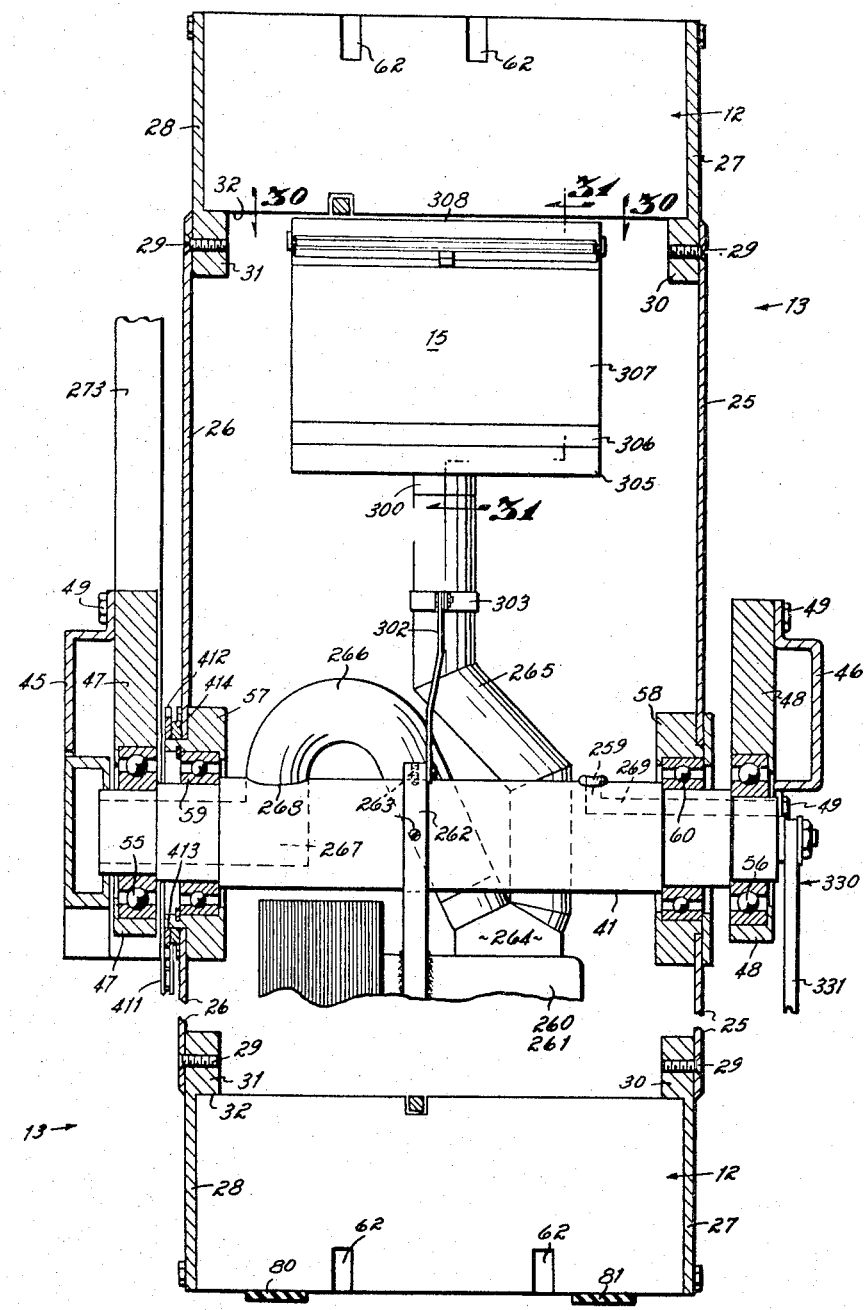
Figure 5:
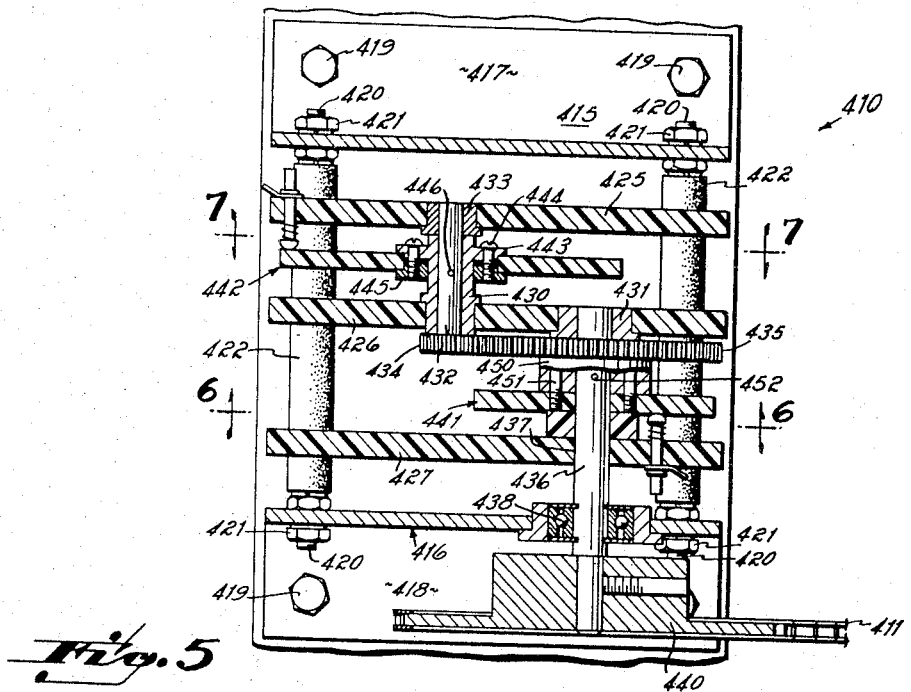
Figure 6:
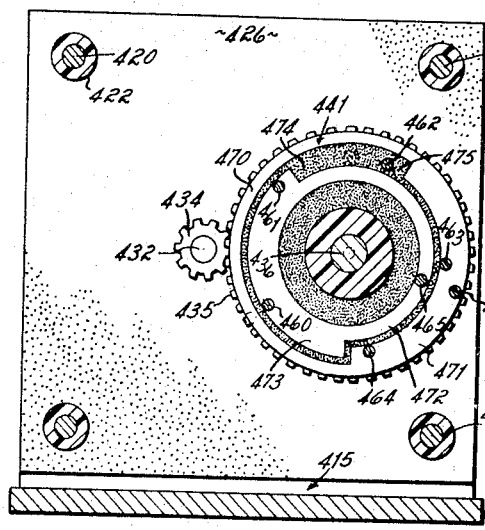
Figure 7:
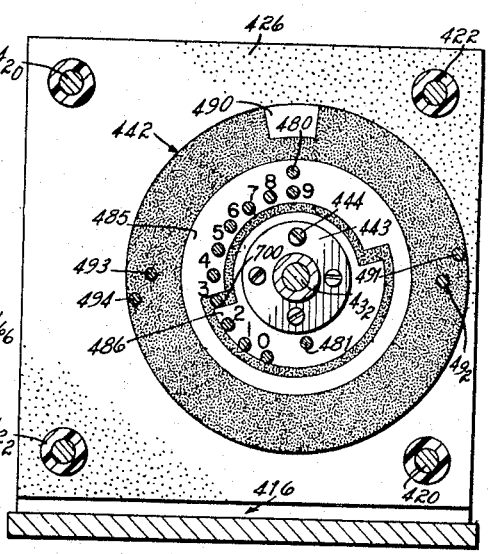
Figure 8:
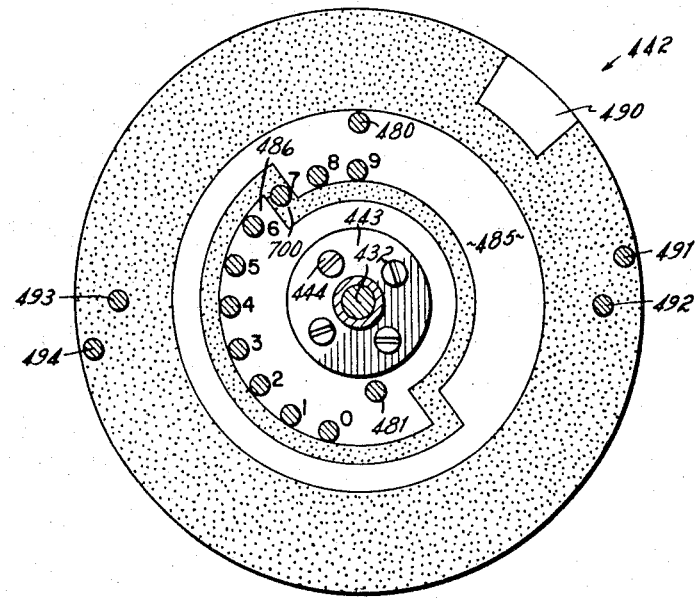
Figure 9:
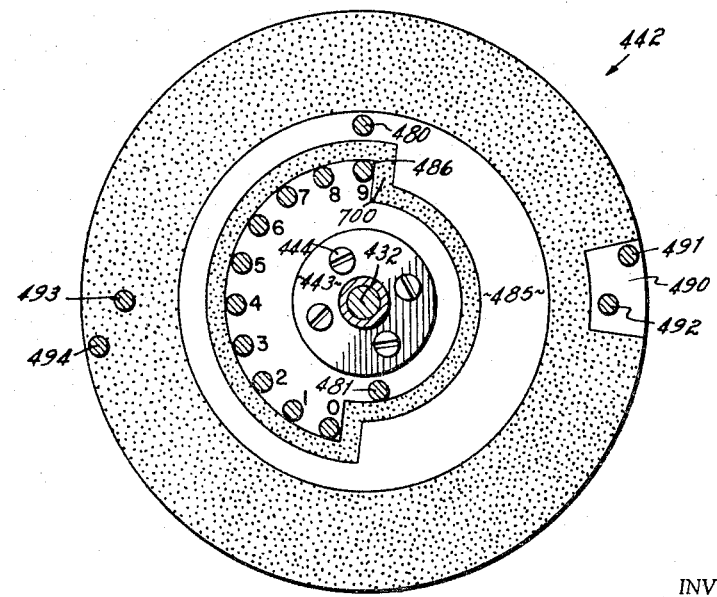
Figure 10:
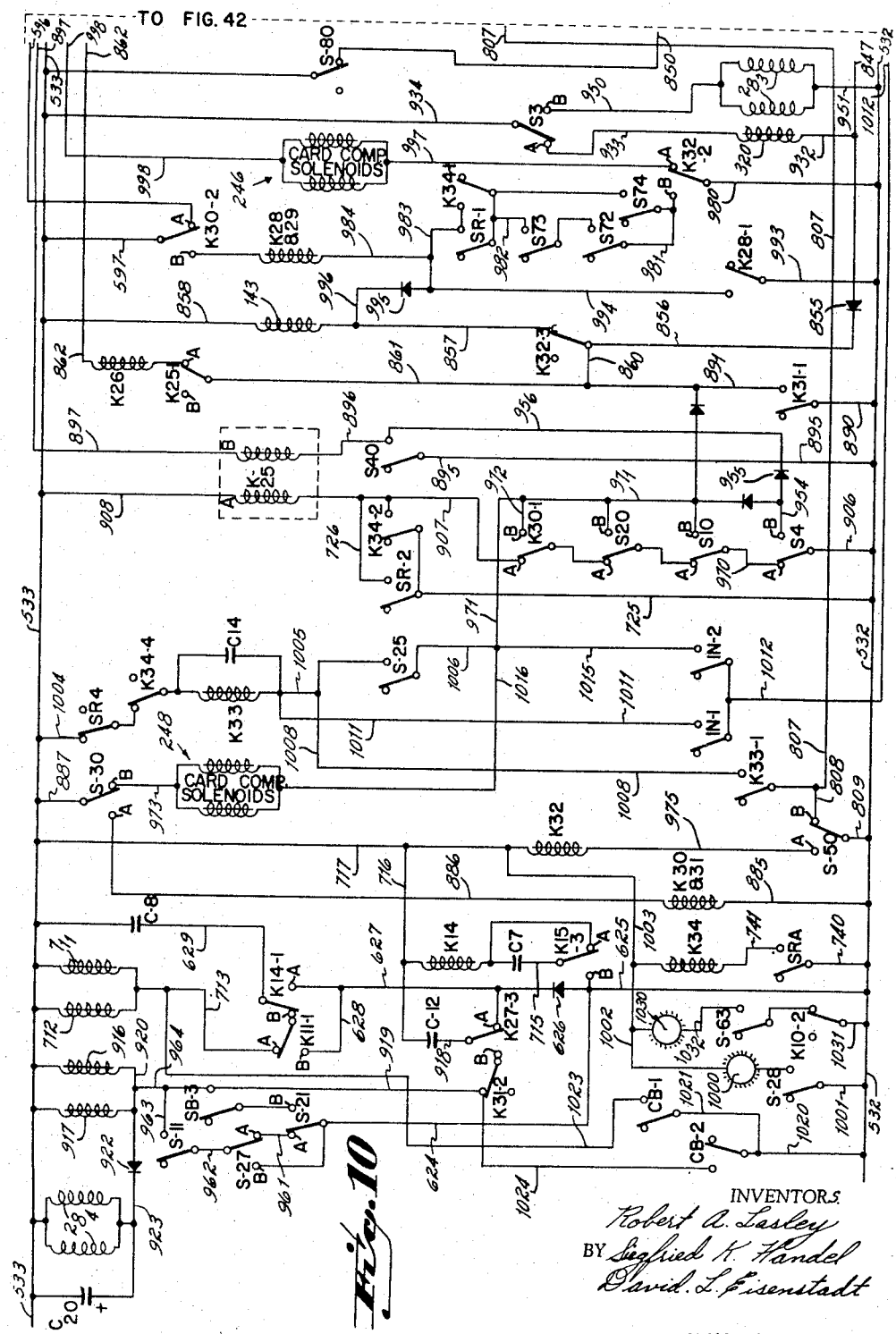
Figure 11:
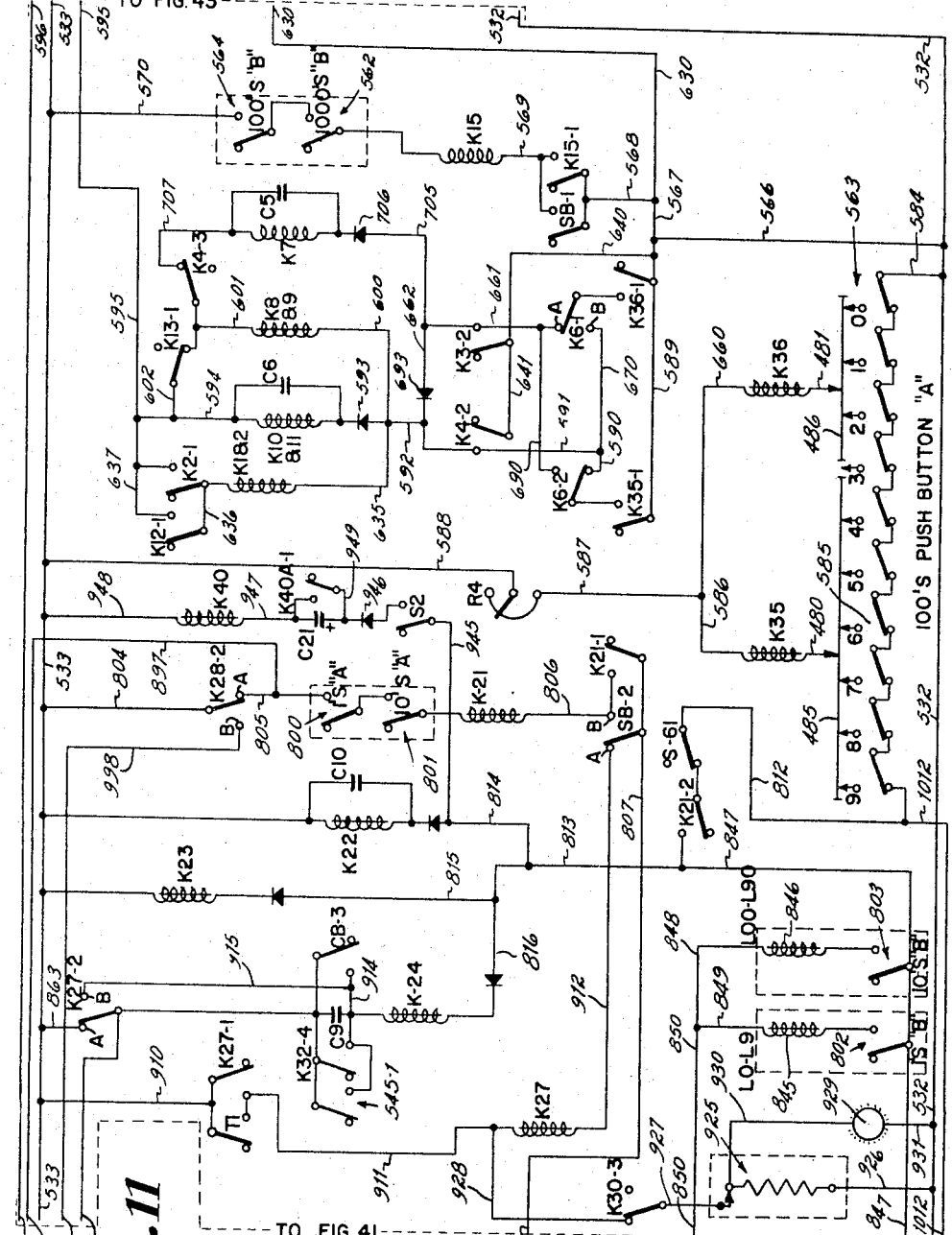

These and other objectives and advantages of the invention will be more readily apparent from a detailed description of the drawings in which:

FIGURE 1 is a perspective view of the card selecting apparatus of this invention, FIGURE 2 is a side elevation partially broken away of one side of the machine, FIGURE 3 is a view similar to FIGURE 2 of the opposite side of the machine, FIGURE 4 is a cross sectional view taken along line 4—4 of FIGURE 2, FIGURE 5 is a cross sectional view of the selector switch taken along line 5—5 of FIGURE 2, FIGURE 6 is a cross sectional view taken along line 6—6 of FIGURE 5, FIGURE 7 is a cross sectional view taken along line 7—7 of FIGURE 5, FIGURES 8 and 9 are enlarged views of the pocket selection commutator of FIGURE 5 in various rotated positions, FIGURES 10, 11, 12 and 13 are a combined wiring diagram of the card filing system of this invention.

Referring to FIGURES 1, 2 and 3, it will be seen that the indexing control system of this invention is illustrated as applied to a card filing and retrieval system located within a housing 10 and controlled by a console unit 11. The console unit 11 may be mounted within the housing 10 or outside of it as shown in FIGURE 1 depending upon whether remote control is desired.

This system is particularly designed for selection of cards which have coded notches along their upper edge (see FIGURE 4) engageable with selector fingers to prevent all but a selected one of the cards from moving relative to the pack during the card selecting or scanning portion of the operation cycle. The cards are stored within pockets 12 located around the periphery of a drum 13. In a preferred embodiment there are 50 pockets, each of which will contain 100 cards. The cards may carry information printed, written, typed, punched, or magnetically coated upon the faces thereof, or may have apertures therein within which are mounted microfilms adapted to be projected onto a screen or viewed via a closed circuit television. In the embodiment illustrated in the drawings the system is equipped with a projecting lamp for projecting microfilm onto a screen or illuminating film for viewing via closed circuit TV. It is to be understood that direct viewing or manual card removal are equally adaptable in this system.

In operation, the drum is rotated so as to locate a pocket having a preselected card therein to the 12:00 or upper position at which the selector mechanism 14 is located. Thereafter the drum is rocked relative to an air nozzle 15 which directs a gaseous stream against the bottom of the cards within the pocket so that the preselected card which is unrestrained against movement within the pocket will be moved upwardly by the air stream between a pair of card transport rollers. At this time the remaining unselected cards in the pack are held down by the selector fingers and thus restrained against movement so that the preselected card is in the proper position after the pocket is scanned. The selector fingers are then withdrawn and the card transported via the card transport mechanism 17 into the viewing position. With the selected card in the transport mechanism and completely out of the drum, the drum returns to its starting position where card compressor fingers 20 enter a gap between the pocket wall and the front card in the pocket and are held in this position while the drum is rotated counterclockwise as viewed in FIGURE 3 to compress the cards within the pocket. Thereafter, upon a signal from the operator, the card drive rollers of the card transport mechanism are rotated in a direction opposite to that in which they were rotated to remove the card from a pocket and the card returned to the gap between the front wall of the pocket and the forwardmost card in the pack. The fingers are withdrawn and the drum returns to its starting or base reference position. Thereafter the cycle may be repeated by selecting the next card at console unit.

The details of the card retrieval system have not been illustrated and described herein since they form no part of the invention of this application. A complete description of this card filing and retrieval system may be found in our co-pending parent application Ser. No. 279,234, filed May 9, 1963, of which this application is a division.

As shown in FIGURES 2, 3 and 4, card storage drum 13 is driven in rotation by a pair of endless card retainer belts 80, 81. The belts engage the cards through an arc of approximately 270° of rotation of the drum and disengage the cards during the upper 90° of the arc. Movement of the belt is transferred frictionally to the drum and causes it to rotate. Belts 80, 81 are supported upon pairs of idler pulleys 82, 83, 84, 85 and 86 which are in turn rotatably mounted upon stationary brackets 87, 88, 89, 90 and 91 respectively.

Movement of the belts is imparted from either of two sources depending upon whether the drum is being rotated from one pocket to another or moved from one position of the pocket to another during the scanning operation. During rotation from one pocket to another the drum rotates at a much greater speed than during scanning when the drum is merely rocked or oscillated so as to move the drum a finite distance relative to the air nozzle. For this reason the belts 80, 81 pass beneath rocker arm assembly pulleys 100, around motor pulleys 101 and under rocker arm assembly pulleys 102. The drum is driven in rotation for movement from one pocket to another by rotation of motor pulleys 101 which are driven by a reversible electric motor 103. It is oscillated or rocked during the scanning operation as a result of oscillation of the rocker arm assembly 104 about the axis 141 of the motor pulleys 101.

Main drive motor 103 drives pulleys 101 through a conventional gear reduction box 99 which has two output shafts 105, 106 to which the pulleys are nonrotatably keyed by a pair of keys 107, 108 respectively. Thus, when main drive motor 103 is driven in rotation, the pulleys 101 cause movement of the belts 80, 81 and consequent rotational movement of the card containing drum 13.

*Digital selector switch*

For purposes of controlling drum rotation from any pocket to any preselected pocket a digital selector switch 410 cooperates with the reversible driving motor 103 to control drum rotation via the shortest route to the preselected pocket. As shown in FIGURES 2, 4 and 5, selector switch 410 is driven by an endless chain 411 which is in turn driven by a sprocket 412 attached to the side wall plate 26 of drum 13. Sprocket 412 is mounted over a flange portion 413 of annular ring 57 and is spaced from the side wall plate 26 by a spacer ring 414 in such a manner that the sprocket 412 is driven by the drum 13.

Referring to FIGURES 5, 6, 7, 8 and 9, selector switch 410 includes a pair of L-shaped end brackets 415, 416, the horizontal legs 417, 418 respectively of which are bolted to the base of the frame 42 by bolts 419. Four mounting rods 420 extend between the vertical sections of the brackets 415, 416 and are secured thereto by bolts 421. Spacer sleeves 422 are secured over each of the rods between the brackets 415, 416 to prevent their inward collapse.

Three plates 425, 426 and 427 of insulated material are mounted upon the rods 420 in spaced relation. Two of these plates, 425 and 427, serve as stator plates upon which are mounted a plurality of electrical contacts or brushes. The other insulated plate 426 serves as a journal plate within which two bearings 430 and 431 rotate. A pinion shaft 432 extends through the bearings 430 and has one end journalled within a bearing 433 mounted within stator plate 425. The opposite end of the pinion shaft 432 has a pinion gear 434 mounted thereon which is driven in rotation by a larger gear 435 mounted upon the bearing 431. The shaft of gear 435 extends through the bearing 431, through an aperture 437 in stator plate 427, and through a ball bearing 438 mounted within the end bracket 416. The free end of shaft 436 is nonrotatably attached to a sprocket 440 which is driven in rotation by chain 411.

A segment or tens commutator 441 is nonrotatably mounted upon shaft 436 and a pocket commutator 442 is similarly nonrotatably mounted upon pinion shaft 432. The pocket commutator 442 is secured to a flange 443 of bearing 430 by a plurality of screws 444 and a locating ring 445. The bearing 430 is nonrotatably keyed or pinned to the pinion shaft 432 by a tapered locking pin 446 so that the pinion and pocket commutator 442 rotate together. In a similar manner the segments commutator 441 is attached to an annular flange 450 of gear 435 by a plurality of screws 451. The flanges 450 of gear 435 is nonrotatably keyed to the shaft 436 by a tapered pin 452 so that as the chain 411 drives the sprocket 440 it causes the shaft 436 and attached gear 435 to rotate. Rotation of gear 435 causes rotation of pinion shaft 432 and the pocket commutator 442. The ratio between the small pinion gear 434 and gear 435 is 2½:1 so that for every one rotation of gear 435, gear 434 and attached pocket commutator 442 rotates through 2½ revolutions.

Referring to FIGURES 5 and 6, it will be seen that the segments stator 427 has seven contacts or brushes mounted thereon. Each is spring biased into engagement with the segments commutator 441. The segments commutator controls rotation of the drum via the shortest path at a high speed to the preselected segment or ten pockets. Since in the preferred embodiment there are fifty pockets in the drum the segments stator has five equally spaced brushes 460, 461, 462, 463 and 464 located thereon representing or controlling rotation of the drum to the zero to 9th pocket, 10th to 19th pocket, 20th through 29th pocket, the 30th to 39th pocket and the 40th to 49th pocket respectively. Additionally, there are two common brushes 465 and 466 mounted upon the segments stator 427 and engageable with the segments commutator 441. One of the common brushes 465 is located closer to the axis 436 of the commutator 441 than the five segments brushes 460, 461, 462, 463 and 464 while the other common brush 466 is located at a greater distance from the axis than the five segments brushes. The segments commutator 441 has two electrically conductive foil sections mounted thereon in a generally concentric manner. The outer section of foil 470 is generally circular and has an arcuate section 471 of increased thickness which extends through approximately 144°. The inner section 472 is mounted concentric with the outer section and has an arcuate portion 473 of greater thickness than the remaining portion. The thickened section 473 also extends through an arc of approximately 144°. The thickened sections 473 of foils 471 and 473 are located in closely adjacent but non-abutting relation so that an insulated area 474 separates all portions of foil 470 from foil 472. Through approximately 288° the foils are separated by a relatively narrow band of insulative material while in a 72° arcuate section they are separated by a wide insulative area. The inner common brush 465 always engages the inner foil 472 while the outer brush 466 always engages the outer foil 470. The five segments or tens brushes 460, 461, 462, 463 and 464 are engageable with either the inner or outer foil depending upon the location of the segments commutator 441 relative to the segments stator 427. In all locations of the segments commutator 441, two of the segments brushes will be in engagement with the inner foil 472 and two of the segments brushes will be in engagement with the outer foil 470 while one of the segments brushes will be engaged with the wide insulative area 475.

Referring to FIGURES 5 and 7, it will be seen that the units brushes, 0–9, are spaced approximately 17° apart on the arc of a semi-circle so that the units 0 brush is located approximately 170° from the units 9 brush. All of the units brushes, 0–9, are mounted upon the stator plate 425 and are spring biased into engagement with the units commutator 442. Two other common brushes, 480, 481, are also mounted upon the units stator plate 425. The common brushes 480, 481 are mounted approximately 180° apart relative to the axis of the units commutator 442. One of these commons 480 is mounted closely adjacent the 9 unit brush on a radius slightly greater than the radius of the arc upon which the 0 to 9 units brushes are mounted. The other common brush 481 which is mounted 180° away relative to the common brush 480, is located upon a radius slightly less than the radius of the units brushes. The units commutator 442 also has two generally annular concentric foil sections 485, 486 mounted thereon and engageable with selected brushes on the units stator plate. The outer foil section 485 is relatively thin through an arc of slightly more than 180° and thick through an arc of slightly less than 180°. The inner foil section 486 is relatively thin through slightly more than 180° and thick through an arc of slightly less than 180°. The two sections are concentrically mounted upon the commutator plate with the thick portion of the inner foil section adjacent the thin portion of the outer foil section. Thus the two define therebetween two insulative arcuate sections of varying radii interconnected by two insulative radial sections.

The units commutator also has an electrically conductive section of foil 490 mounted adjacent its periphery. This section 490 is effective to close an electrical circuit through either of two pairs of brushes mounted approximately 180° apart on the units stator 425. Referring to FIGURE 7, one pair of these brushes is designated as 491, 492 and the other pair is designated as 493, 494. Each pair of brushes, when electrically connected by the section of foil 490, are operative to energize a flip-flop circuit. This flip-flop circuit cooperates with the foil sections to maintain a fixed direction of motor rotation as it moves the drum from one pocket to the next preselected pocket. Without the flip-flop circuit, the motor would often reverse the direction of rotation when control was switched from the segments commutator to the units commutator.

In this particular application, to control a drum with 50 pockets, the low speed or segments commutator has five contacts, equally spaced on a circle; whereas, the high speed plate or units commutator has ten contacts, equally spaced on half a circle. As explained above, the two control discs are mechanically connected by means of a gear having a ratio of 2.5:1. Therefore, the "high speed" disc or units commutator turns half a revolution, scanning ten contacts or "pockets," during the time the "low speed" disc or segments commutator rotates ⅕ of a revolution, scanning one contact or one segment. A typical selection of a "pocket" always occurs in the following way. First, the selector switch will find the segment, which the selected "pocket" is part of, on the shortest path. Upon entering the segment, the same direction of rotation will be maintained until the selected pocket is found; i.e., the energized contact is opened at the non-conductive stopping gap of the high speed disc. This is accomplished by associated control circuitry which will be described hereinafter in connection with the machine operation. When a pocket is selected in the same segment, the selected "pocket" is controlled by the high speed disc only. Therefore, it will find immediately the selected pocket on the shortest path.

Since the high speed disc is a commutator with two "halves" or split phases to obtain the "shortest path" rotation of the drum, a "flip-flop" circuit is required to maintain predetermined direction of rotation when entering or crossing segments. This occurs at every half a revolution of the high speed disc. The four outer contact rivets—two on either side—are used to control a latch relay which, in turn, reverses the direction of rotation which each half of the units commutator controls at every half a revolution of the units commutator. This is required only when pockets in different segments are selected.

In this particular application, to control a drum with 50 pockets or five segments, another latch relay is required to correct the "flip-flop" for different directions of rotation. This latch relay is controlled by the low speed disc or segment control and is required whenever there is an odd number of segments. This latch relay actually reverses the "flip-flop" for the two directions of rotation. The operation of these latch relays and associated "flip-flop" circuits will be more fully appreciated in connection with a reading of the operation of the machine and associated circuitry which follows.

System operation

Figure 12:
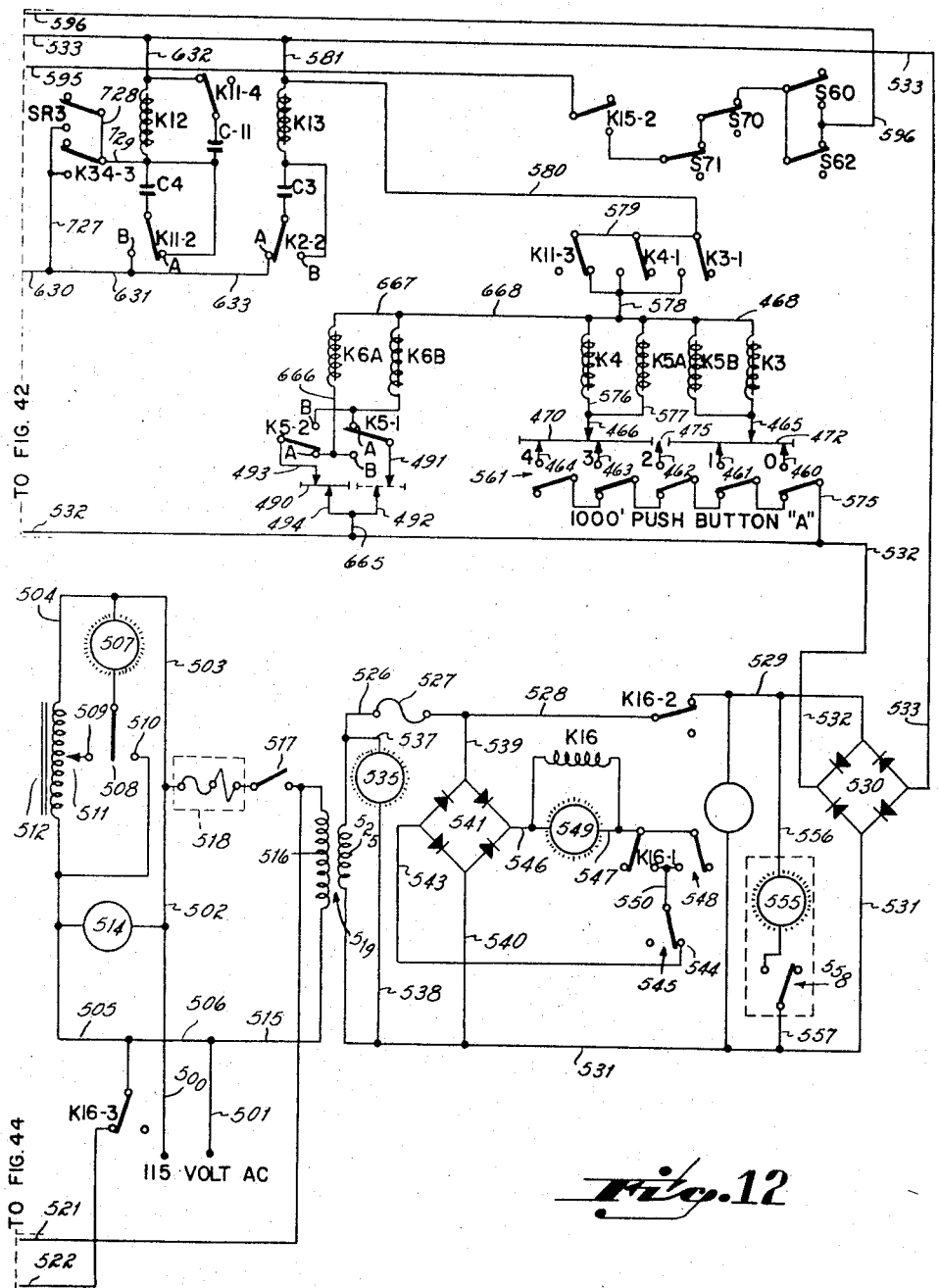

Power is supplied to the machine of this invention from a 115 volt AC source to the leads 500, 501 (FIGURE 12). The leads 500, 501 are connected by leads 502, 503, 504, 505 and 506 to a projection lamp 507 upon the closing of a three position switch 508. The center position of switch 508 is labeled off and one contact 509 of the switch is labeled TV while the other contact 510 is labeled projector. When the switch is placed in the projector position, the projection lamp 507 receives full line voltage via a circuit through contact 510 of switch 508. When placed in the TV position, the switch is connected through a contact 509 and brush 511, through a variable transformer 512 to the line 504. Thus, when the switch 508 is in the TV position, the projection lamp receives less than full line voltage. The lamp cooling blower 514 is connected across the lines 502 and 505 so that it is always on whenever the machine is plugged into a 115 volt AC source.

The line 501 is also connected via lead 515 to the primary winding 516 of a transformer 519 through the normally open master switch 517, a circuit breaker 518 and lead 502 to line 500. Power is supplied to the primary winding of the transformer whenever the master switch 517 is closed. Additionally, closing of the master switch 517 supplies AC power to the motors of the machine via leads 515, 520 and main lead 521 and from line 500 via leads 502, 503, 504, and 505, through normally closed contact K16-3 to the main lead 522. The leads 521 and 522 are the main leads to the AC machinery of the system.

Power from the secondary winding 525 of the transformer 519 is supplied via lead 526 through a fuse 527, lead 528, through normally closed contact K16-2 and lead 529 to one leg of a rectifier bridge 530. The opposite leg of the rectifier bridge 530 receives low voltage AC current from the secondary winding 525 of the transformer 519 via lead 531. The two output contacts of the rectifier bridge supply DC power to the main control circuit via leads 532 and 533. The leads 532 and 533 are the main control circuit leads.

Connected between the lines 526 and 531 is the "power on" indicator lamp 535 mounted upon the file cabinet. The lamp 535 is connected to the lead 526 by the lead 537 and to the lead 531 by the lead 538.

Connected between the leads 528 and 531 are rectifier bridge 541, input leads 539 and 540 by means of which DC power is supplied to an emergency stop circuit. One output lead 543 from the rectifier bridge 541 is connected to one contact 544 of a normally closed "reset" switch 545. The other output lead 546 from the rectifier bridge is connected to one side of an emergency indicator lamp, the opposite side of which is connected via a lead 547 to a normally open emergency stop switch 548. An emergency stop lockout relay K16 is connected in parallel with the emergency stop lamp 549. In the event of an emergency such as a jammed card in the drum or a defective relay in the control circuit, etc. closing of the emergency stop switch 548 completes a DC circuit from the rectifier bridge via lead 543, normally closed reset switch 545, lead 550, closed emergency stop switch 548 and leads 547 and 546 to the emergency lamp 549 and the emergency stop lockout relay K16. Energization of relay K16 closes the normally open contact K16-1 to maintain the circuit to relay K16 after the emergency stop button is released. The contact K16-2 also opens to open the power supply circuit to the rectifier bridge 530 and thus turn off the power to the main lines 532, 533 of the control circuit. Additionally, energization of relay K16 causes the contact K16-3 to open and turn off all AC power to the main lines 521, 522 and thus to all of the AC machinery in the system. To release the emergency stop lockout relay K16 opening contact K16-1 and closing normally closed contacts K16-2 and K16-3, the reset switch 545 is manually opened which de-energizes the relay K16.

Also connected across the leads 529 and 531 are the keyboard button indicator lamps 555 which are connected to these leads by leads 556 and 557. While only one lamp is illustrated in the circuit diagram, in actuality there are 35 such indicator button lamps connected in parallel and associated with the units, tens, hundreds and thousands buttons, each lamp of which goes on beneath the button to indicate that a selected button has been closed or selected when the keyboard button is pushed downwardly. A switch 558 is connected in series with each lamp, each switch of which is closed upon the pushing downwardly of each keyboard button.

To select a pocket and to cause a drum to move to the preselected pocket, one of the thousands push buttons 551 (see FIGURE 1) and one of the hundreds push buttons 552 must be selected and pushed manually by the system's operator. Additionally, the search button 560 at the keyboard must be actuated by the system's operator. By way of example, assume that the drum is at the 23rd pocket initially and the No. 36 pocket is selected by the system's operator. The operator therefore pushes the fourth push button in the thousands push button row 551 and the seventh push button in the hundreds push button row 552. When these push buttons are actuated they cause the switch 558 associated with each to close and light the lamps 555. Each of the thousands and hundreds push buttons are double pole switches. The A contacts of the thousands push buttons are connected in series in a thousands push button bank 561 and the B contacts are similarly connected in series (only one of the thousands B contacts being illustrated at 562). The hundreds push button A contacts are similarly connected in series in a bank 563 and the B contacts are similarly connected in series in a bank 564 (only one of the B contacts in the hundreds row being shown). The thousands B contacts 562 and the hundreds row B contacts 564 are series connected so that one of the thousands push buttons and one of the hundreds push buttons must be energized before a search is initiated.

When the search button is actuated at the keyboard, it causes the contact SB1 (FIGURE 11) to momentarily close and energize the relay K15 via leads 566, 567, 568, contact SB1, lead 569, the closed B contact in the thousands bank 562, the closed B contact in the hundreds bank 564, and lead 570. Energization of relay K15 closes the holding contact K15-1 and maintains the relay K15 energized. The energization of the relay K15 also closes the contact K15-2 (FIGURE 12) so that power may be supplied to the pocket selection control circuit.

Assuming that the No. 36 pocket is selected by the system operator, the fourth push button in the thousands contact row is pushed and the A contact completes a circuit to the relays K4 and K5 via lead 575, the brush 463, the outer foil section 470 on the thousands commutator 441, the brush 466, lead 576 and 577, lead 578, normally closed contact K11-3, and leads 579, 580 and 581. Energization of relay K4 closes the holding contact K4-1 to maintain power to the relays K4a and K5a even though the relay K11 subsequently causes the contact K11-3 to open.

When the 36th pocket is selected by the system operator, the 7th contact in the hundreds A bank is closed and the relay K35 thus energized through a circuit via lead 584, the closed contact 585 of the bank of contacts 563, the seventh brush on the hundreds stator 425, the foil 485 on the hundreds commutator, the brush 480, leads 586, 587, through rheostat R4 and lead 588.

Energization of the relay K35 closes the contact K35-1 to complete a circuit to the relays K10 and K11 via lead 566, lead 589, closed contact K35-1 and closed contact K6-2A, lead 590 and lead 591, lead 592, through diode 593, through relays K10 and K11, leads 594, 595, the closed contact K15-2, closed switches S71 and S70 which remain closed so long as the card compressor fingers are out of the drum, closed card transport safety switch S62, lead 596, the closed contact K30-2A, and lead 597. A capacitor C6 is connected in parallel with the relays K10 and K11 and acts as a delay circuit to delay de-energization of these relays for the period of time constant of the capacitor C6.

Two relays K8 and K9 connected to leads 592 and 594 in parallel with relays K10 and K11 are energized simultaneously with relays K10 and K11 via a circuit through leads 600, 601, normally closed contact K13-1, and lead 602. Energization of relay K8 causes the drum rotating motor 103 to start to rotate, in this case in the clockwise direction as viewed in FIGURE 3. Referring now to FIGURE 13, it will be seen that AC power is supplied to the motor field and armature windings of motor 103 via closed contact K1-1, through the two resistors, R2 and R3, via lead 605, lead 606, through the closed contact K8-1B, lead 607, through contact K7-1A, via lead 608, through motor field winding 609, via lead 610, through contacts K7-2A and K8-2B and via lead 611. At this time the motor 103 starts to rotate. The relay K9 which is energized simultaneously with the relay K8, is a motor controlled dynamic braking relay which causes the contact K9-1 to move to the open position and thus this relay prevents DC braking current from being supplied to the motor field winding 609 at this time.

Energization of relay K10 causes the contact K10-1 (FIGURE 13) to close so that AC current is supplied to the primary winding 615 of transformer 616 via leads 617, closed contact K10-1, and lead 618. The secondary winding 619 of transformer 616 supplies low voltage AC current to a rectifier bridge 620. There is no flow of current from the rectifier bridge at this time because the contact K9-1 is open.

Energization of the relay K11 closes the contact K11-1B (FIGURE 10) to charge capacitor C8 via leads 625, through diode 626, leads 627, 628, through contacts K11-1 and K14-1 and via lead 629. When the capacitor C8 is discharged, it energizes the keyboard release solenoids 711 and 712 as is explained more fully hereinafter.

The energization of relay K11 also closes the contact K11-2B (FIGURE 12) to pulse the relay K12, the current being supplied via lead 566, 630, 631, through capacitor C4 and relay K12, and via lead 632. Energization of relay K11 also opens the contact K11-3 (FIGURE 12) but this has no effect upon the relays K4 and K5A since the holding contact K4-1 is at this time closed. The contact K11-4 also opens upon energization of relay K11 so that the capacitor C11 is not charged at this time.

When the relay K12 is pulsed the contact K12-1 momentarily closes to energize the speed control relay K1 and the speed control lock in relay K2 via leads 566, 589, contacts K35-1, K6-2, leads 591, 592, 635, 636, through contact K12-1 and via leads 637, 595, 596 and 597. The closing of relay K2 causes the holding contact K2-1 to close and maintain the relays K1 and K2 energized.

When the machine was turned on, the relay K13 (FIGURE 12) was pulsed through the normally closed contact K2-2A by completion of a circuit via leads 566, 567, 630, 631, 633, contact K2-2A, capacitor C3, and lead 581. Upon energization of the relay K2, the contact K2-2 opens or engages the B contact to form a closed loop around the capacitor C3 and thus discharge the capacitor C3. In this condition, the motor control brake relay K13 is in condition to be pulsed upon de-energization of the relay K2 and consequent closing of the contact K2-2.

Energization of the speed control relay K1 closes the contact K1-1B so that a greater voltage is supplied to the motor 103 and its speed is increased. In this position of the contact K1-1 the circuit to the motor is completed via leads 650, through the contact K1-1B, through a high speed centrifugally operated governor switch 651, through lead 652 and resistor R3, via leads 605 and 606, through the contact K8-1 to the motor 103. In the event that the motor rotates at a greater speed than that for which it is set, the high speed governor 651 opens and the circuit to the motor is completed via lead 653, through resistor R1 and leads 655 and 606 to the motor. The resistor R1 is of greater resistance than either of the resistors R2 and R3 which combined have a greater resistance than the resistor R1, so that less voltage is supplied to the motor and its speed is reduced. An arc suppression capacitor C2 is connected in parallel with the resistor R1 to minimize arcing in the speed control governor switch during changes in speed of the motor 103. Similarly, a capacitor C1 is connected in parallel with the resistor R3 across the leads 652 and 605 so as to minimize arcing.

When the drum is rotated from the 23rd pocket to the 36th, as viewed in FIGURE 2, the drum rotates in the counterclockwise direction causing the sprocket 440 to rotate in the same direction carrying with it the thousands or segments commutator 441. The hundreds commutator 442, however, rotates in the opposite direction. Thus as viewed in FIGURES 6, 7, 8 and 9, both commutators are rotating in the counterclockwise direction with the hundreds commutator rotating 2½ times as fast as the thousands or segments commutator. As the drum rotates from the 23rd pocket to the 36th pocket, the gap in the foil on the thousands commutator or insulated portion of the commutator moves to a position at the 26th pocket where the insulated portion of the commutator interrupts the circuit to the relay K35. However, the brush 463 on the thousands or segments commutator remains engaged with the foil 470 until the 30th pocket is reached so that the circuit to the relay K4 is maintained. Thus the contact K4-2 remains closed and the circuit to the relays K1 and K2, K10 and K11, and K8 and K9 is maintained as the drum passes the 26th pocket via a circuit through lead 566, leads 640 and 641 and contact K4-2. Thus the contacts K35-1 and K36-1 are by-passed at this time so that the segments or thousands commutator overrules the hundreds commutator and the drum continues to rotate and the relays K1 and K2, K10 and K11 and K8 and K9 remain energized via this by-pass circuit through the contact K4-2 until the proper segment of the commutator is entered.

As shown in FIGURE 8, when the drum rotates to a position in which the 27th pocket is in the 12:00 position and the insulated section of the hundreds commutator covers the number seven brush of the hundreds commutator, the inner foil ring 486 establishes electrical contact between the number six brush of this commutator and the brush 480 to energize the relay K36 via a circuit through the closed A contacts of the bank of switches 563, through the number six brush of the hundreds commutator, via the foil 486 and through the leads 660, 587 and 588. At this time the relay K35 is de-energized since none of the A bank switches in contact with the outer ring of foil 485 is closed. Thus the contact K35-1 opens and the contact K36-1 closes. Closing of the contact K36-1 closes a secondary circuit to the coils K1 and K2, K8 and K9, K10 and K11 via a circuit through leads 566, 589, contact K36-1, contact K6-1, lead 661, lead 662, lead 592 and leads 635, 594 and 600. The directional relay K7 remains de-energized at this time since the contact K4-3 of relay K4 is in series with the relay K7 and is open at this time.

When the commutator moves to the position illustrated in FIGURE 9 and the drum is in a position intermediate the 29th and 30th pockets, the foil section 490 on the hundreds commutator covers both of the brushes 491 and 492 and completes a circuit between these brushes to energize the relay K6A via a circuit through lead 665, brush 492, foil section 490, brush 491, contact K5-1 which is engaged with its B contact as a result of the relay K5A having been energized simultaneously with the relay K4, lead 666, and leads 667, 668, 578, closed contact K4-1 and leads 579, 580 and 581. The contacts K5-1 and K5-2 are contacts of a flip-flop circuit both of which reverse their positions and reverse the polarity of the contacts with which they are engaged upon energization of either relay K5A or K5B. Energization of relay K6A reverses the positions of the flip-flop contacts K6-1 and K6-2 so as to reverse the polarity of the contact with which each of these is engaged. The varying of the positions of the contacts K6-1 and K6-2 completes a circuit to the relays K1 and K2, K10 and K11 and K8 and K9 via lead 566, contact K36-1, contact K6-1B, lead 670, and leads 591 and 592. Simultaneously the circuit to the relays K1 and K2, K8 and K9 and K10 and K11 which had been closed via contact K6-1A, leads 661 and 662 is open. Since the relay K35 is de-energized at this time, the contact K35-1 is open and there is thus no current flow in lead 690 at this time.

When the drum reaches the position in which the 30th pocket is in the 12:00 position, the thousands commutator 441 will be in a position in which the insulated portion 475 of the commutator 441 covers the brush 463 and thus opens the circuit to the relays K4 and K5A. De-energization of relays K4 and K5A opens the holding circuit through K4-1 to the relay K4 and opens the contact K4-2 (FIGURE 12) and closes the contact K4-3 to the directional relay K7 (FIGURE 12). Closing of the contact K4-3 at this time does not energize the relay K7 which when energized causes the drum to rotate in the counterclockwise direction because the circuit to the relays K1 and K2, K8 and K9 and K10 and K11 is completed at this time by a lead 566, contact K36-1, contact K6-1B, lead 670, lead 591, and lead 592. While the circuit to the directional relay K7 is closed upon the closing of the contact K4-3, the diode 693 effectively blocks the current flow through that relay at this time. Therefore the drum will continue to rotate in the clockwise direction after the 30th pocket is passed until the 36th pocket which is the selected pocket is reached.

When the drum reaches the 36th pocket the hundreds commutator 442 is located in a position in which the insulated section 700 is located over the No. 6 brush so that the relays K35 and K36 are both temporarily de-energized with the result that the contacts K35-1 and K36-1 are both simultaneously opened. Thus the circuits to the relays K1 and K2, K8 and K9, K10 and K11 are all opened. However, the capacitor C6 in parallel with the relays K10 and K11 forms a delay circuit for these relays so that they remain temporarily energized for the length of time equal to the time constant of the capacitor. De-energization of relay K2 causes the contact K2-2 (FIGURE 12) to move into the A position in which a circuit is completed through the capacitor C3 so as to pulse the relay K13. Pulsing of relay K13 temporarily opens the contact K13-1 (FIGURE 11) and then allows the relay to again close. The reason for the pulsing of the relay K13 and temporary opening of the contact K13-1 is to insure that the direction relay K7 is not energized at this time since this would cause the main drive motor to immediately rotate in the counterclockwise direction. Additionally, opening of contact K13-1 maintains relays K8 and K9 de-energized to insure that the drum stops completely before reversing.

De-energization of relay K8 causes the contacts K8-1 and K8-2 (FIGURE 13) to move to the A position so that the AC power supply circuit to the armature of motor 103 is opened. De-energization of relay K9 causes the contact K9-1 to close so that DC power is supplied from the rectifier bridge 620 to the field winding 609 of motor 103 via lead 701, closed contact K9-1, contact K7-1A, lead 608, lead 702, lead 610, contact K7-2A and K8-2A and via lead 703. During this time interval when there is no current to the armature of motor 103 and DC current is supplied to the field winding 609 of motor 103, the motor is dynamically braked and brought to a halt.

The relays K10 and K11 are not de-energized at this time since the capacitor C6 connected in parallel with these two relays, discharges until the drum coasts past the gap or insulated portion of the hundreds commutator 442 at which time the opposite section of foil 485 engages the No. 6 brush on the commutator and again energizes the relay K35 to complete the circuit to these relays. At this point it should be noted that the drum does not stop immediately upon arriving at the selected pocket, the 36th pocket in this example, since it is rotating at high speed and coasts past the pocket for a slight distance. The amount of coasting, of course, depends upon numerous variables such as the inertia of the drum, the amount of DC power applied to the field winding of the motor, etc. By way of example, assume that the drum continues to rotate or coasts to the 38th pocket before it finally stops.

As the drum rotates past the 36th pocket the No. 6 brush on the hundreds commutator engages the outer ring of foil 485 to again energize the relay K35 causing the contact K35-1 to close. Closing of the contact K35-1 completes a circuit to the relays K8, K9, K10 and K11 via lead 566, lead 589, contact K35-1, contact K6-2B, leads 690, 661, 662, through diode 693 and via lead 592. The closing of contact K35-1 also completes a circuit to the directional relay K7 at this time via leads 661 and 705 through the diode 706, via lead 707, through the closed contacts K4-3 and K13-1 via leads 602, 595, 596 and 597. A capacitor C5 is connected in parallel with the directional relay K7 between leads 705 and 707 so that the directional relay K7 is not energized until after the relays K1 and K2 and K8 and K9 are energized. When the relay K7 is energized it causes the contacts K7-1 and K7-2 to move into their B positions in which position the motor 103 is driven in the counterclockwise direction.

When the drum rotation starts in the opposite or counterclockwise direction toward the 36th pocket from the position in which it stopped, it rotates at a slow rate of rotation since the speed control relay and speed control lock in relay K1 and K2 respectively remain de-energized. These relays are de-energized since the contact K2-1 opens as the selected pocket is passed the first time at the high speed rate of rotation and the relay K12 is not again pulsed so that the contact K12-1 thus remains open. With the relay K1 de-energized low voltage current is supplied to the motor via a circuit through lead 650, contact K1-1A, resistor R2, lead 652, a low speed centrifugal governor switch 708, lead 606, contact K8-1B, through the armature of motor 103, lead 607, lead 709, contact K7-1B, lead 710, lead 610, through the field winding 609 of motor 103, lead 702, lead 608, contact K7-2B and contact K8-2B and lead 611.

The motor thus rotates at the slow rate of rotation in the counterclockwise direction until the drum arrives at the selected 36th pocket. At this time the gap 700 in the hundreds commutator again covers the No. 6 brush of the hundreds stator and opens the circuit to both the relays K35 and K36. De-energization of relays K35 and K36 opens the contacts K35-1 and K36-1. Opening of these contacts results in the relays K8 and K9 being immediately de-energized so that AC current to the armature of motor 103 is discontinued upon the opening of the contact K8-1B. DC braking current from the rectifier 620 is then supplied to the field winding 609 of the motor via a circuit through lead 701, closed contact K9-1, contact K7-1B, lead 710, lead 610, through the winding 609, via lead 702, lead 608, contact K7-2B, contact K8-2A and lead 703. Thus the motor is immediately braked and since it is rotating at a slow rate of rotation, it does not coast past the selected pocket.

Upon discharge of the capacitors C5 and C6, the relays K7, K10, and K11 are de-energized to condition the motor control circuit for the next cycle of operation. De-energization of relay K10 opens the contact K10-1 (FIGURE 13) and thus the circuit to relay K11 closes the contact K11-1A (FIGURE 10) discharging the capacitor C8 through the hundreds and thousands keyboard button release solenoids 711 and 712 via a circuit through leads 629, contact K14–1B, contact K11–1A, and lead 713. The pulsing of the hundreds and thousands release solenoids 711 and 712 opens the circuit to all of the hundreds push button A contacts and the thousands push button A contacts as well as the B contacts of these same push buttons. Opening of the hundreds and thousands B contacts opens the circuit to the relay K15 (FIGURE 12) to de-energize this relay. De-energization of the relay K11 also closes the closed loop circuit around the capacitor C4 (FIGURE 12) to discharge this capacitor through the closed loop and thus condition it for pulsing the relay K12 during the next cycle of operation. De-energization of the relay K11 also closes the contact K11–3 to condition the relays K3, K4, K5A and K5B for the next cycle of operation. The opening of the circuit to the relay K11 also closes the contact K11–4 (FIGURE 12) to condition the speed control lock-out relay K12 for the next cycle.

In the event that a pocket is selected on the hundreds and thousands keyboard push buttons which is in the 12:00 position or adjacent the selector fingers, a drum position sensing relay K14 (FIGURE 10) is provided which will immediately pop the keyboard buttons outwardly and allow the pocket scanning operation to proceed. When the hundreds and thousands push buttons are initially actuated and the search button pushed the relay K15 is energized as was explained heretofore. Energization of relay K15 closes the contact K15–3B causing the relay K14 to be pulsed via a circuit through lead 625, contact K15–3B, lead 715, capacitor C7, the relay K14, and the leads 716 and 717. The pulsing of relay K14 causes the contact K14–1A to momentarily close and charge the capacitor C8. The contact K14–1A then immediately opens and the contact K14–1B closes since the relay K14 was pulsed through the capacitor C7 and did not remain energized. Since the relay K11 will not be energized if the selected pocket is in the 12:00 position, the contact K11–1A is closed and the capacitor C8 is immediately discharged through the hundreds and thousands keyboard release solenoids 711 and 712 via a circuit through lead 629, contact K14–1B, contact K11–1A and lead 713. Thus the keyboard release solenoids are pulsed immediately upon actuation of the search button and the scanning cycle will immediately start if the selected pocket is in the 12:00 position at the time the search is initiated.

Assuming that a pocket was selected which as viewed in FIGURE 3 required counterclockwise movement of the drum in order for it to rotate via the shortest route to the selected pocket, the control circuit would operate in much the same manner as outlined above except that in this situation the directional relay K7 would be energized simultaneously with the relays K1, K2, K8, K9, K10 and K11. By way of illustration assume that the pocket No. 23 was initially in the 12:00 position and the No. 10 pocket was selected. Under these circumstances relays K3 and K5–B would initially be energized rather than the relays K4 and K5–A. The circuit to the relays K3 and K5–B would then be completed via lead 575, brush 461, foil section 472, brush 465, through relays K3 and K5–B, via leads 468 and 578, through normally closed contact K11–3 and via leads 579, 580 and 581. Energization of relay K3 closes the holding contact K3–1 to maintain the relay K3 energized until the drum reaches the selected segment. Energization of the relay K3 also closes the normally open contact K3–2 to complete a circuit to the relays K1 and K2, K8 and K9, K10 and K11 and the directional relay K7 via leads 566, 640, contact K3–2, lead 661, leads 705 and 662. With the relay K7 energized the contacts K7–1B and K7–2B close to energize the drum rotation motor 103 in the counterclockwise direction as was explained earlier. Energization of the relay K5–B in this situation closes the contacts K5–1B and K5–2B to energize the relay K6–B. Energization of the relay K6–B closes the contacts K6–1B and K6–2B to maintain these flip-flop contacts in the correct position for maintaining counterclockwise rotation of the drum when the control is transferred from the thousands or segments commutator 441 to the hundreds or pocket commutator 442. In all other respects the pocket selection cycle operates in the same manner when started in the counterclockwise direction as when started in the clockwise direction.

The remainder of the control circuit illustrated in FIGURES 10–13, but not described herein, pertains to card retrieval control functions which have no bearing upon the invention of this divisional application. A complete description of this circuit as well as the machine which it controls may be found in application Ser. No. 279,234, from which this application was divided.

While only a single preferred embodiment of this invention of this application has been disclosed and described herein, those skilled in the art to which this invention pertains will readily appreciate numerous changes and modifications which may be made without departing from the spirit of this invention. Therefore, we do not intend to be limited except by the scope of the appended claims.

Having described our invention, we claim:

1. Indexing apparatus comprising,
 a base,
 a member movable upon said base to a plurality of index positions,
 reversible motor means drivably connected to said member, and
 motor control means operable to control said motor and thereby move said member to a selected indexable position through the shortest path of movement to said selected position,
 said control means including a digital selector switch,
 said switch having at least two stator means upon each of which are mounted a set of contacts, each of said sets including a plurality of contacts, one of said sets being operative to control movement of said member to approximately the preselected position, and the other set being operative to control movement of said member to the exact preselected position,
 said switch having at least two commutators upon each of which are mounted two electrically conductive areas engageable with the contacts of one of said stators, the electrically conductive areas of each commutator being operable to control motor rotation in opposite directions,
 said control means including a flip-flop circuit operable to reverse the direction of rotation controlled by the conductive areas of one of said commutators.

2. Indexing apparatus comprising,
 a base,
 a member movable upon said base to a plurality of index positions,
 reversible motor means drivably connected to said member, and
 motor control means operable to control said motor and thereby move said member to a selected indexable position through the shortest path of movement to said selected position,
 said control means including a digital selector switch,
 said switch having at least two stator means upon each of which are mounted a set of contacts, each of said sets including a plurality of contacts,
 the first of said sets being operative to control movement of said member to a selected segment within which are located a plurality of index positions equal in number to the number of contacts in the other set,
 said other set being operative to control movement of said member to the exact preselected index position,
 said switch having a segments commutator upon which are mounted two electrically conductive areas engageable with said first set of contacts, the electrically conductive areas of said segments commutator being operative to control rotation of said motor in opposite directions, said switch having a units commutator upon which are mounted two electrically conductive areas engageable with the contacts of said other set of contacts, the electrically conductive areas of said units commutator being operative to control rotation of said motor in opposite directions, said control means including a flip-flop circuit operable to reverse the direction of rotation controlled by the conductive areas of said units commutator.

3. Indexing apparatus comprising, a base, a member movable upon said base to a plurality of index positions, reversible motor means drivably connected to said member, and motor control means operable to control said motor and thereby move said member to a selected indexable position through the shortest path of movement to said selected position, said control means including a digital selector switch, said switch having at least two stator means upon each of which are mounted a set of contacts, each of said sets including a plurality of contacts, the first of said sets being operative to control movement of said member to a selected segment within which are located a plurality of index positions equal in number to the number of contacts in the other set, said other set being operative to control movement of said member to the exact preselected index position, said switch having a segments commutator upon which are mounted two electrically conductive areas engageable with said first set of contacts, the electrically conductive areas of said segments commutator being operative to control rotation of said motor in opposite directions, said switch having a units commutator upon which are mounted two electrically conductive areas engageable with the contacts of said other sets of contacts, the electrically conductive areas of said units commutator being operative to control rotation of said motor in opposite directions, said control means including a flip-flop circuit operable to reverse the direction of rotation controlled by the conductive areas of said units commutator each time a selected point on said units commutator passes selected ones of said other set of contacts, said control means including a second flip-flop circuit controlled by said segments commutator and operable to reverse the orientation of said first flip-flop circuit.

4. A digital selector switch for controlling the indexing of a rotatable load device through a continuous circular path from any one of at least 20 discrete positions to any other one of said positions via the shortest path of movement, either clockwise or counterclockwise, comprising:

(a) a fixedly mounted stator means,
(b) first and second sets of electrical contact pins carried by the stator means,
 (1) the first set including 2 common pins and at least 2 tens digit representing pins,
 (2) the second set including 2 common pins and at least 10 units digit representing pins, whereby any one of the discrete positions may be specified by a tens pin and a units pin,
(c) a rotatably mounted commutator co-operatively disposed adjacent the stator means and mechanically coupled to the load device for synchronous rotation therewith,
(d) at least a pair of first electrically conductive areas carried on the commutator in engagement with the first set of pins and electrically insulated from each other, and
(e) at least a pair of additional electrically conductive areas carried on the commutator in engagement with the second set of pins and electrically insulated from each other and from the first conductive areas whereby a first circuit established across one of the first conductive areas between one of the common pins of the first set and one of the tens pins controls the rotation of the load device during a first phase of operation into an area represented by the second set of pins, and in which a second circuit then established across one of the additional conductive areas between one of the common pins of the second set and one of the units pins controls the rotation of the load device during a second phase of operation until it reaches a desired one of said discrete positions.

5. A digital selector switch as defined in claim 4 wherein:

(a) the first electrically conductive areas comprise a pair of electrically conductive areas which are generally annular in shape and one of which is nested within the other,
(b) the additional electrically conductive areas also comprise a pair of generally annular shape areas one of which is nested within the other, and
(c) each of said pair of conductive areas is mounted upon a separate rotatable commutator disc.

References Cited

UNITED STATES PATENTS

| | | | |
|---|---|---|---|
| 2,969,490 | 1/1961 | Anderson et al. | |
| 3,243,780 | 3/1966 | Bendick et al. | |
| 2,505,262 | 4/1950 | Torcheux | 318—467 |
| 2,798,994 | 7/1957 | Dicke | 318—33 |
| 3,059,984 | 10/1962 | Handel | 318—467 X |
| 3,062,997 | 11/1962 | Lloyd | 318—467 |

ORIS L. RADER, *Primary Examiner.*

T. LYNCH, *Assistant Examiner.*